United States Patent [19]

Petro

[11] 4,309,169
[45] Jan. 5, 1982

[54] MACHINE PARTS PROTECTING SYSTEM

[75] Inventor: John Petro, Belleville, N.J.

[73] Assignee: Westinghouse Electric Corp., Pittsburgh, Pa.

[21] Appl. No.: 219,712

[22] Filed: Dec. 24, 1980

[51] Int. Cl.³ .......................... F24F 9/00; F27D 7/00
[52] U.S. Cl. ........................................ 432/64; 65/159
[58] Field of Search ................... 432/64; 65/159, 270, 65/272

[56] References Cited

U.S. PATENT DOCUMENTS

| | | | |
|---|---|---|---|
| 2,756,980 | 7/1956 | Ott | 432/64 |
| 3,021,125 | 2/1962 | Stuchbery | 432/64 |
| 3,451,661 | 6/1969 | Barker | 432/234 |
| 3,480,264 | 11/1969 | Krause | 432/121 |
| 3,580,553 | 5/1951 | Urich | 432/132 |
| 3,687,443 | 8/1972 | Bode, Jr. | 432/227 |

*Primary Examiner*—John J. Camby

*Attorney, Agent, or Firm*—R. S. Lombard

[57] ABSTRACT

A machine parts protecting system for protecting those parts of a machine that may be in close proximity to high temperature flames. This system is for a machine used for processing workpieces and has a plurality of workpiece holding members which are indexed in a stop-and-go fashion through a number of operating stations. The protecting system includes a photo-detector to detect that a workpiece is not being held by one of the workpiece holding members and to send a first signal to a memory circuit which retains that information until a predetermined time when the empty workpiece holding member arrives at an operating station with high temperature flames. At that time the memory circuit initiates a second signal opening a solenoid valve, thereby permitting an air jet to blow the high temperature flames away from the empty workpiece holding member.

5 Claims, 8 Drawing Figures

MACHINE PARTS PROTECTING SYSTEM

CROSS-REFERENCE TO RELATED APPLICATIONS

In copending application Ser. No. 219,695, filed Nov. 24, 1980, filed concurrently herewith by the present applicant and others, and assigned to the present assignee, there is described an integral machine for making substantially contaminant free high-intensity discharge arc tubes. The machine uses the heat from the pressing operation to aid in the evacuation and filling of the arc tube.

In copending application Ser. No. 219,713, filed Nov. 24, 1980, filed concurrently herewith by J. J. Murphy and L. D. Estrada and assigned to the present assignee, there is described a rotatable turret having a constant index time and a variable dwell time. The turret is used for the production of worked pieces.

In copending application Ser. No. 219,696, filed Nov. 24, 1980, filed concurrently herewith by J. J. Murphy and assigned to the present assignee, there is described an automatic tipping-off apparatus for hermetically sealing a dosed and otherwise processed arc tube for a high-intensity-discharge arc tube.

In copending application Ser. No. 219,693, filed Nov. 24, 1980, filed concurrently herewith by P. Fix and K. Collins and assigned to the present assignee, there is described an apparatus for press sealing a tubular quartz body portion about a ribbon-type metallic seal. The press sealing apparatus utilizes a burner that deforms the tubular quartz body portion in such a manner to provide sufficient quartz for the press seal.

BACKGROUND OF THE INVENTION

This invention relates to a machine parts protecting system for protecting those parts of a machine that may be in close proximity to high temperature flames and, in particular, to a machine for processing workpieces which carries the workpiece from operating station to operating station in a stop-and-go fashion.

A number of machine parts protecting systems are known in the art. One such system is disclosed in U.S. Pat. No. 3,580,553, dated May 25, 1971, issued to Daniel M. Urich. This patent discloses an improved pellet hardening machine including a preheating section where pellets of iron ore are preheated and an indurating section where the preheated pellets are heated to a desired hardness. A stripper assembly is provided for removing pellets from a conveyor on which they are transported. Replacement of the stripper assembly necessitates shutting down the operation of the pellet hardening machine or assembly with a resultant decrease in plant productive time and an increase in pelletizing costs. To increase the life of the stripper assembly it is cooled by a flow of air from a pump or other source of air under pressure, thereby increasing the life of the stripper assembly.

In U.S. Pat. No. 3,480,264, dated Nov. 25, 1969, issued to Wilhelm Krause, is disclosed a metallurgical furnace wherein workpieces are transported intermittently through a heating chamber and rest on stationary holders during intervals between step-wise advances. The holders are protected by heat-insulating material and are separated from each other by narrow vertical gaps through which scale and like solids can descend but which admit little heat to the respective holders. The holders are internally cooled by a circulating fluid and have rows of plate-like work-engaging portions which extend upwardly and consist of highly heat-resistant metallic material.

In U.S. Pat. No. 3,451,661, dated June 24, 1969, issued to John S. Barker, is disclosed an arrangement for protecting and insulating water-cooled tubular support members in a furnace of the type used for heating steel ingots after the ingots have been formed into suitable shapes. An inner layer of resiliently deformed insulating material covers the support member. An outer layer of interlocking refractory elements covers the inner layer and holds it in radial compression while the inner layer in turn holds the outer layer in a state of circumferential stress. The refractory elements are designed to permit limited freedom of movement therebetween to accommodate the effects of thermal stresses and vibrational shocks.

In U.S. Pat. No. 3,687,433, dated Aug. 29, 1972, issued to Charles H. Bode, Jr., is disclosed a device for protecting a conveyor which carries metal workpieces as they undergo a flame cutting operation. The device is intended particularly for conveyors which carry continuously cast products as segments are cut therefrom. The conveyor includes endless chains and slats extending from between chains. A flame-cutting apparatus travels in synchronism with the workpiece as it cuts and sometimes lies directly over a slat. A protective device overlies such slat and the workpiece rests thereon. Damage is confined to the protective device if the flame-cutting apparatus lies directly thereover.

It is apparent from the foregoing art that the protective devices used are in continual operation during the operation of the machine. In many instances though a protective device may only be required occasionally when, for example, a workpiece is not being held by a workpiece holder. Then, instead of the workpiece being heated by high temperature flames, certain parts of the workpiece holder will be exposed to the flames with a resultant shortening in life of those parts.

SUMMARY OF THE INVENTION

There is provided a machine parts protecting system for protecting those parts of a machine that may be in close proximity to high temperature flames. The machine is used for workpiece processing and comprises a plurality of workpiece holding members, each mounted in spaced relationship from one another. A plurality of operating stations is positioned proximate the workpiece holding members and is operable to perform work on the workpieces. Means for moving the workpiece holding members in a stop-and-go fashion is provided so that each of the workpiece holding members is sequentially indexed from operating station to operating station. The machine is operable to receive individual ones of the workpieces at one of the operating stations and to retain the received workpieces in the workpiece holding members for sequential indexing through succeeding operating stations.

The machine parts protecting system comprises a photo-detection and signaling means for detecting at a predetermined one of the operating stations that the one workpiece holding member is not retaining a workpiece and sending a first signal indicative of the lack of presence of a workpiece in the detected one workpiece holding member.

A memory means is in electrical circuit with the photo-detection and signaling means for receiving the first signal and sending a second signal upon the detected workpiece holding member being indexed a predetermined number of times to a predetermined other of the operating stations at which high temperature flames are used for processing the workpieces.

A solenoid valve means is in electrical circuit with the memory means for receiving the second signal. The solenoid valve means is in gaseous relationship with an air jet means positioned at the predetermined other operating station. The air jet means is operable to direct the high temperature flames away from the detected workpiece holding member. Upon the solenoid valve means receiving the second signal, the solenoid valve means opens thereby permitting the air jet means to blow the high temperature flames away from the detected workpiece holding member.

BRIEF DESCRIPTION OF THE DRAWINGS

For a better understanding of the invention, reference may be had to the accompanying drawings, exemplary of the invention, in which.

DESCRIPTION OF THE PREFERRED EMBODIMENTS

Figure 1:
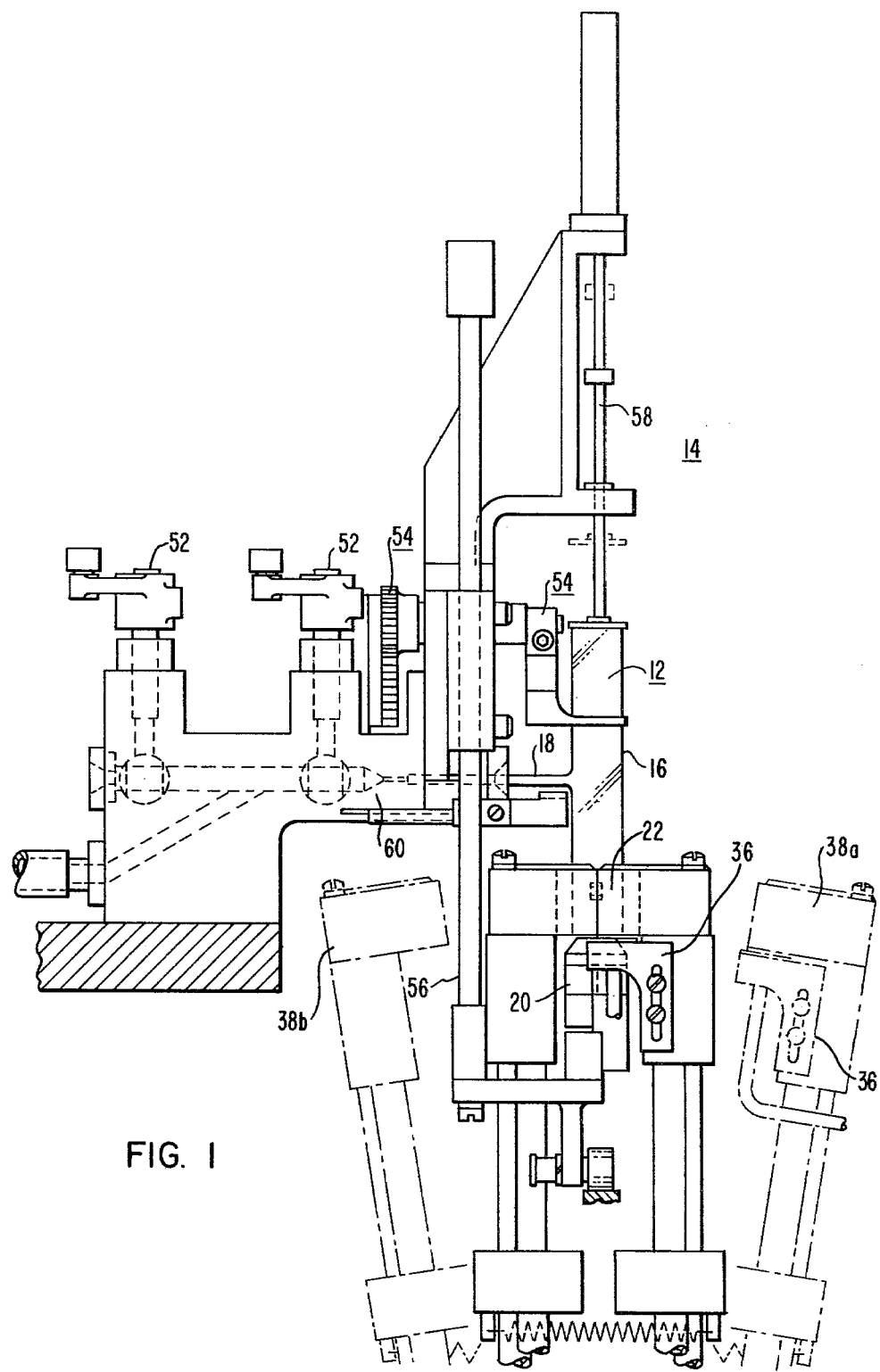
FIG. 1 is an elevational view of a workpiece holding member with a workpiece in proper position.
Figure 2:
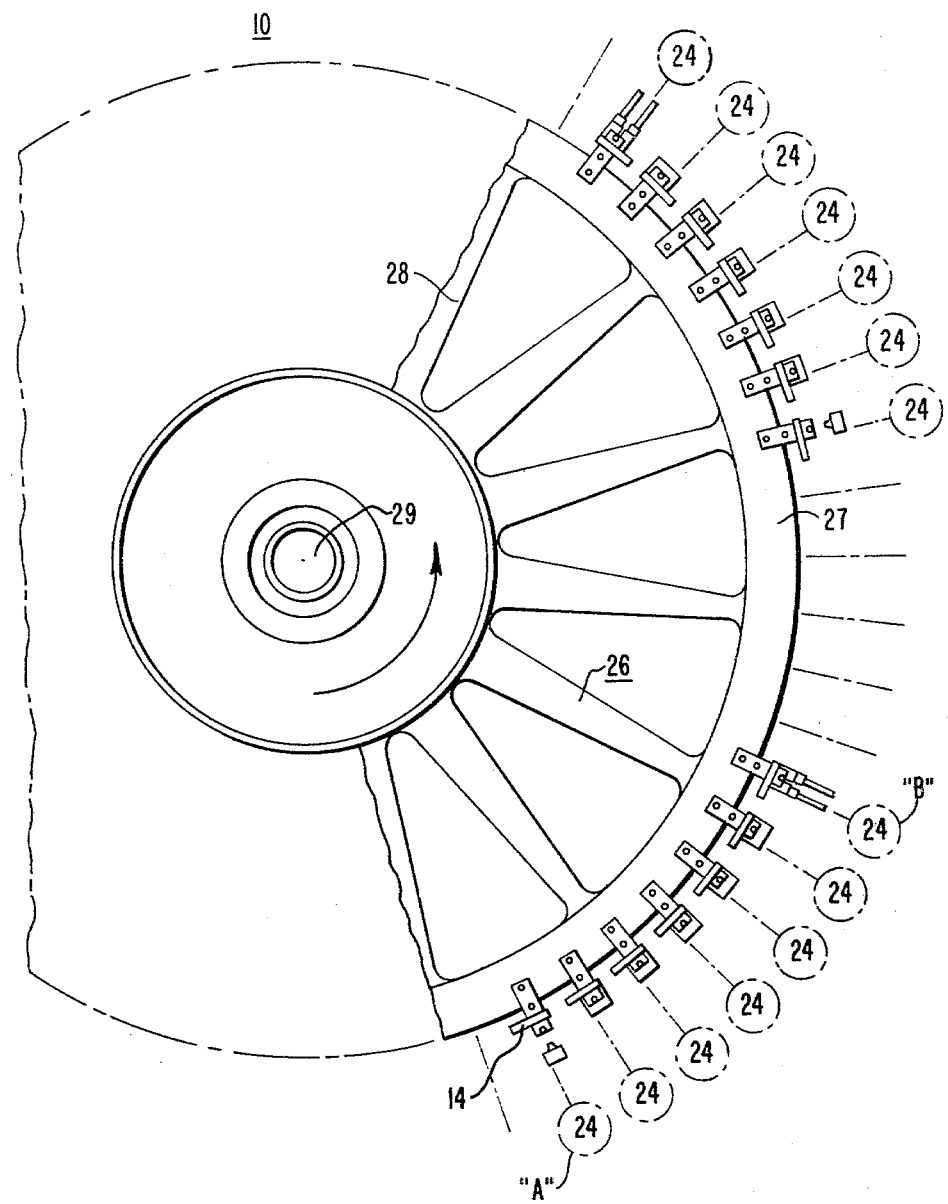
FIG. 2 is a partial plan view of a preferred moving means for the workpiece holding members.

Referring to FIGS. 1–8, there is provided a machine parts protecting system for protecting those parts of a machine that may be in a close proximity to destructive high temperature flames. The machine 10 is used for processing workpieces 12. Although the invention is not thus limited, the machine parts protecting system is particularly useful when applied to an electric-lamp-making machine such as a high-intensity discharge arc tube manufacturing machine having a rotatable turret. The remainder of this description will be with particular regard to such an arc tube making machine. The machine 10 comprises a plurality of workpiece holding members 14 in spaced relationship from one another as shown in FIG. 2. The workpiece 12 shown in FIG. 1 is an elongated tubulated quartz body 16 having an exhaust tubulation 18 in gaseous relationship with the interior of the tubulated body 16, as is well known in the art. The workpiece holding member 14 includes an electrode assembly holder 20 which is positioned at the bottom of the tubulated body 12 in FIG. 1. The electrode assembly holder 20 positions an electrode assembly 22 in proper position at one end of the tubulated body 16 prior to heating and pressing that end of the tubulated body as is well known in the art.

The workpiece holding members 14 are in close proximity to a plurality of operating stations 24 shown schematically in FIG. 2. The operating stations 24 are operable to perform work on the tubulated bodies 16 such as heating and pressing the ends. Means 26 for moving the workpiece holding members 14 in a stop-and-go fashion is provided. As shown in FIG. 2 the workpiece holding members 14 are positioned proximate the peripheral portion 27 of the moving means 26 which as shown in FIG. 2 is a turret member 28. The turret member 28 is mounted for rotation about its axis 29 in a stop-and-go fashion so that each of the workpiece holding members 14 is sequentially indexed from operating station 24 to operating station 24. The machine is operable to receive individual ones of the tubulated bodies 16 at one of the operating stations designated as "A" and to retain the received tubulated bodies 16 in the workpiece holding members 14 for sequential indexing through succeeding operating stations.

Figure 4:
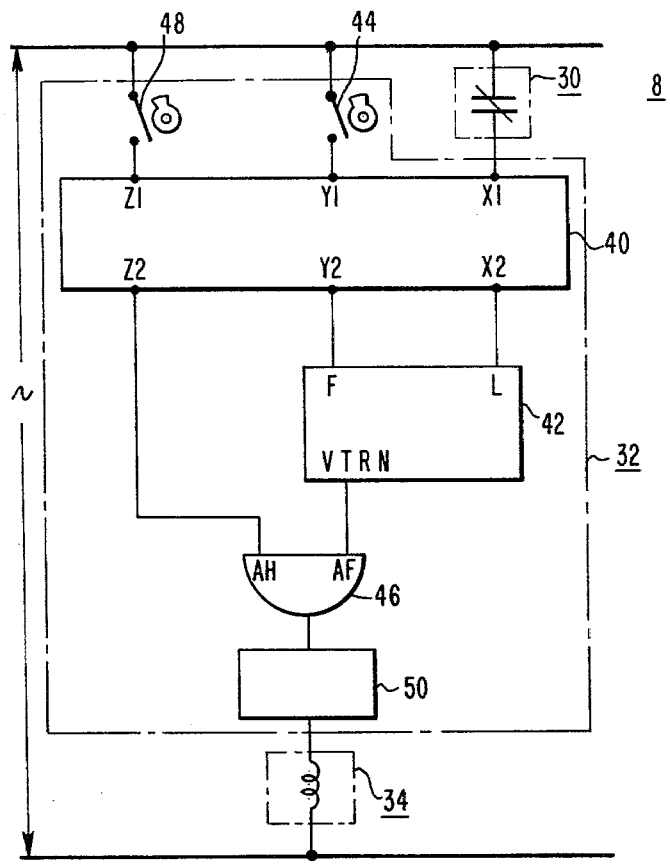
FIG. 4 is a schematic diagram of the memory means in circuit with the solenoid valve means.

The machine parts protecting system 8 is shown schematically in FIG. 4. A photo-detection and signaling means 30 operates to detect at one operating station "A" when the workpiece holding member 14 is not retaining a tubulated body 16 and sending a first signal indicative of a lack of presence of such tubulated body 16 in the detected workpiece holding member. A memory means 32 is in electrical circuit with the photo-detecting and signaling means 30. The memory means receives the first signal from the photo-detecting and signaling means 30 indicative of the lack of the tubulated body 16 and sends a second signal upon the detected workpiece holding member 14 being indexed a predetermined number of times to a predetermined other of the operating stations designated as "B" at which high temperature flames are used for processing the tubulated bodies 16. A solenoid valve means 34 is in electrical circuit with the memory means 32 for receiving the second signal. The solenoid valve means 34 is in gaseous relationship with an air jet means 36 shown in FIGS. 5–8. The air jet means 36 is positioned at the predetermined other operating station "B" and is operable to direct the high temperature flames away from the detected workpiece holding member 14. The solenoid valve means, upon receiving the second signal, opens to permit the air jet means 36 to blow the high temperature flames away from the detected workpiece holding member 14.

Figure 6:
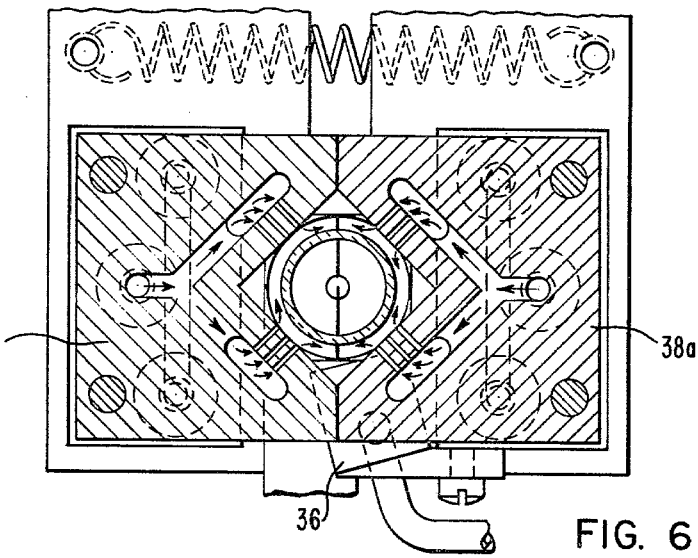
FIG. 6 is a cross-sectional view taken along the line VI—VI in FIG. 5.
Figure 5:
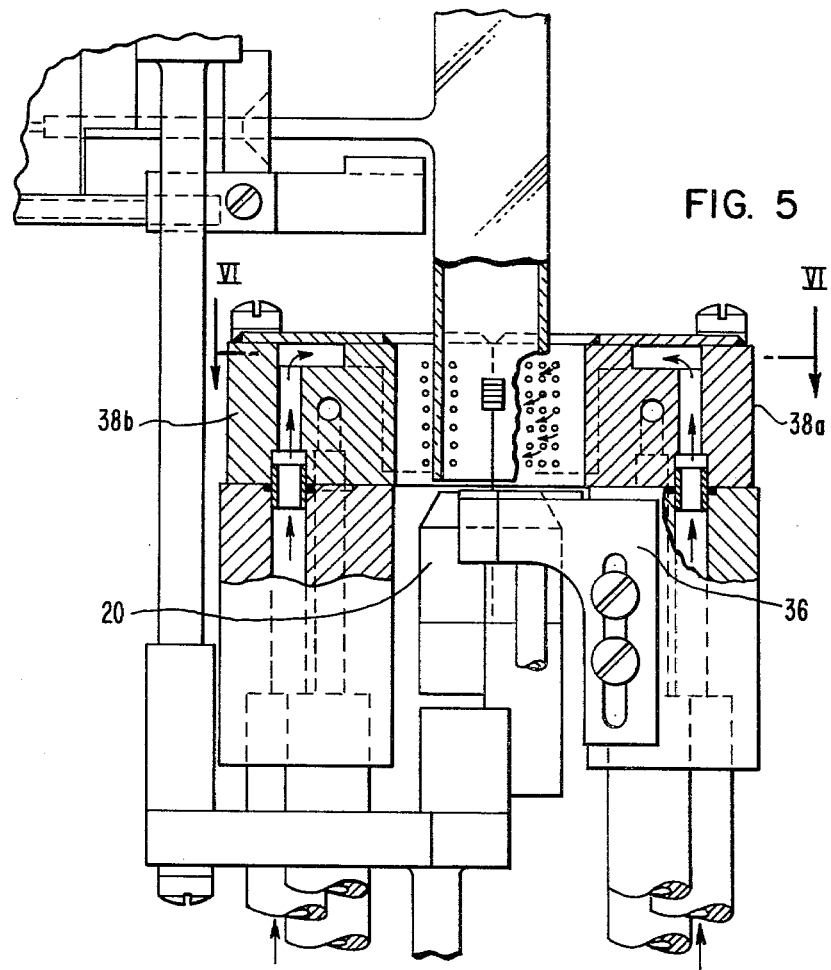
FIG. 5 is an elevational view partly in section of a workpiece holding member having a workpiece in place at an operating station where high temperature flames are being directed at the workpiece.

In this embodiment, burner heads 38a, 38b are positioned at the other operating station "B". The burner heads as shown in FIG. 1 are operable to spread apart when the turret member 28 is indexed and come together after it has indexed and the tubulated body 16 is in position at operating station "B". As shown in FIGS. 5 and 6, the high temperature flames originate at the apertures in the burner heads and are directed toward one end of the tubulated body positioned within the burners 38a, 38b. When a tubulated body 16 is not in position when the workpiece holding member 14 is indexed to the other operating station "B", the high temperature flames can cause a rapid destruction of the electrode assembly holding member 20.

Figure 3:
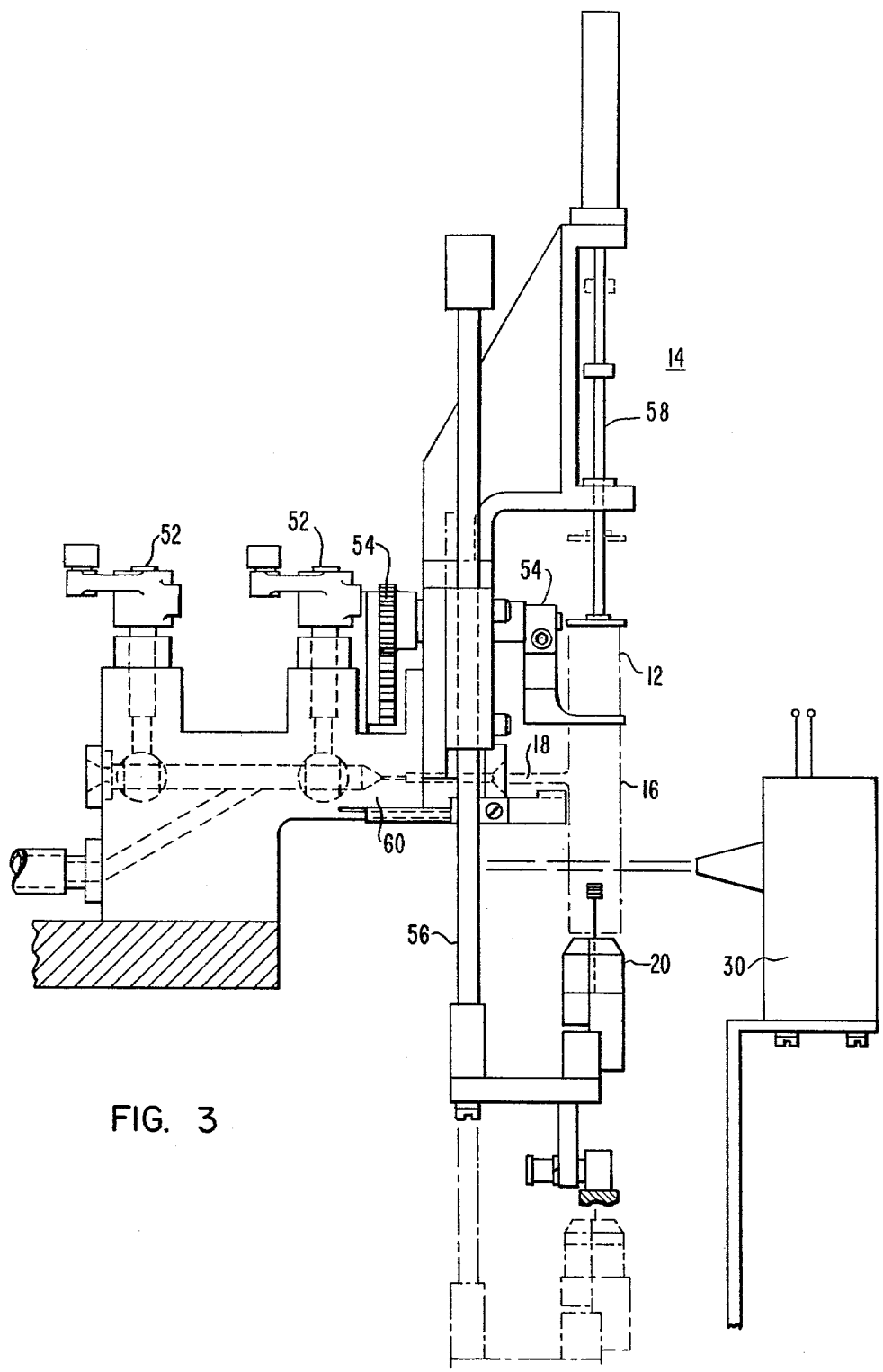
FIG. 3 is an elevational view of a workpiece holding member showing the positioning of the photodetection and signaling means relative to a workpiece.

The photo-detector and signaling means 30 shown in FIG. 3 is positioned at operating station "A" to detect whether a tubulated body 16 is being held by the workpiece holding member 14. The photo-detector used in this embodiment is produced by the Skan-A-Matic Company, Model No. S322-3, and has a normally closed contact as shown in FIG. 4. This photo-detector senses the light reflected back from the tubulated quartz body 16 when it is in position.

Figure 8:
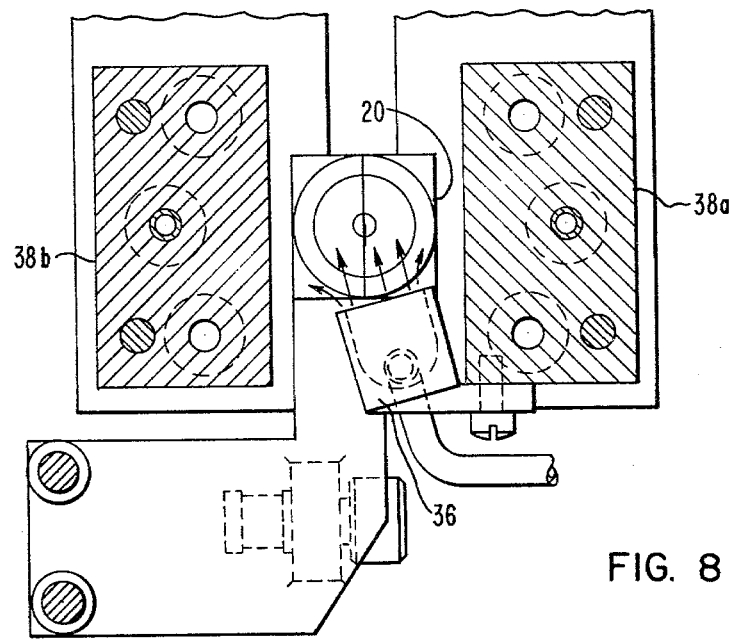
FIG. 8 is a cross-sectional view taken along the line VIII—VIII in FIG. 7 showing the positioning of the air jet means.
Figure 7:
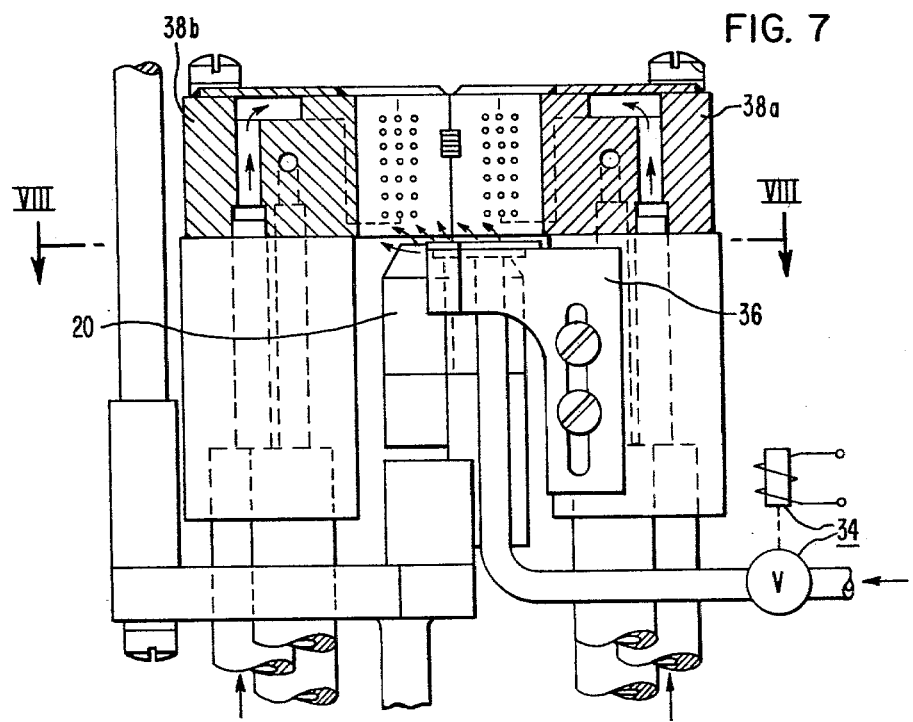
FIG. 7 is an elevational view of the air jet means showing the direction of the air jet over a portion of the workpiece holding member where there is no workpiece in the workpiece holding member.

With reference to FIG. 4, the photo-detecting and signaling means 30 is connected on one side to a 120 volt AC source and, on the other side, is in circuit with an isolated AC input converter module 40, produced by the Digital Equipment Company, Model No. K579, which converts a plurality of 120 volt AC inputs X1, Y1, Z1 to a plurality of 5 volt DC outputs X2, Y2, Z2. The output X2 is the input to terminal L on shift register 42, manufactured by the Digital Equipment Company, Model No. K230, which is a four-stage flip-flop register. The shift register 42 shifts the information from input L successively through the outputs designated N, R, T, and V on each high-to-low transition of input terminal F or from each logic "1" to logic "0" transition at input terminal F. Timing cam switch 44 is set to close upon each index of the turret member 28. One side of the switch 44 is connected to the 120 volt AC source, and the other side is connected to the input Y1 of the converter 40. The output Y2 of the converter 40 is in circuit with the input terminal F of register 42. When the photo-detecting and signaling means 30 detects that there is no tubulated body 16 in the workpiece holding member 14, a logic "1" input appears at input L of the register 42. When the timing cam switch 44 opens just after turret member 28 has been indexed, the input of F goes from a logic state "1" to a logic state "0", which shifts the logic "1" at output terminal N to output terminal R. Upon the next index of turret member 28, the information at output terminal R is shifted to output terminal T. The output at T is connected to one of the input terminals AF of AND gate 44. The other input terminal AH of AND gate 46 is connected in circuit with another timing cam switch 48 which closes just before the empty workpiece holding member 14 is indexed to the other operating station "B". As shown in FIG. 4, between input terminal AH of AND gate 46 and switch 48 is the converter 40 for changing the 120 volt AC at switch 48 to a 5 volt DC at the input terminal AH. Thus, when switch 48 is closed, a logic "1" appears at input terminal AH of AND gate 46 with a logic "1" at input terminal AF, representing the first signal, i.e., workpiece holder 14 is empty, the output of AND gate 46 goes to a logic "1"; this output is connected to an isolated AC switch module 50. The AND gate 46 and the switch 50 are part of a Digital Equipment Company isolated AC switch module, Model No. K616, which upon switch 50 receiving a logic "1" output or 5 volt DC output from AND gate 46, switch 50 converts that output to 120 volts AC which is the second signal that causes solenoid valve 34 to open permitting the air jet 36 which is set at about 20 psi to blow the high temperature flames away from the electrode assembly holder 20 as shown in FIGS. 7 and 8.

The workpiece holding members 14 in the embodiment shown in FIGS. 1 and 3 also include gas control valves 52 for evacuating the tubulated body 16 and filling the tubulated body with the desired fill gas; clamp mechanism 54 which is operable to grasp the tubulated body 16 and hold it in position; supporting rod 56 movable as shown in FIG. 3 to bring the electrode assembly holder 20 into position at the bottom of stopper assembly 58 movable as shown in FIG. 3 to plug one end of the tubulated body to maintain the desired atmosphere with the body; and exhaust tubulation head 60 for holding exhaust tubulation 18 and providing a conduit for evacuating and filling the tubulated body.

I claim:

1. A machine parts protecting system for protecting those parts of a machine that may be in close proximity to high temperature flames, said machine used for processing workpieces and comprising a plurality of workpiece holding members each mounted in spaced relationship from one another, a plurality of operating stations positioned proximate said workpiece holding members and operable to perform work on said workpieces, means for moving said workpiece holding members in a stop-and-go fashion so that each of said workpiece holding members is sequentially indexed from operating station to operating station, said machine operable to receive individual ones of said workpieces at one of said operating stations and to retain said received workpieces in said workpiece holding members for sequential indexing through succeeding operating stations, said machine parts protecting system comprising:

(a) a photo-detection and signaling means for detecting at a predetermined one of said operating stations that the workpiece holding member at said predetermined operation station is not retaining one of said workpieces and sending a first signal indicative of the lack of presence of one of said workpieces in said detected one workpiece holding member;

(b) memory means in electrical circuit with said photo-detecting and signaling means for receiving said first signal and sending a second signal upon said detected workpiece holding member being indexed a predetermined number of times to a predetermined other of said operating stations at which high temperature flames are used for processing said workpieces;

(c) solenoid valve means in electrical circuit with said memory means for receiving said second signal, said solenoid valve means in gaseous relationship with an air jet means positioned at said predetermined other operating station, said air jet means positioned at said predetermined other operating station, said air jet means operable to direct said high temperature flames away from said detected workpiece holding member, and upon said solenoid valve means receiving said second signal, said solenoid valve means is opened to permit said air jet means to blow said high temperature flames away from said detected workpiece holding member.

2. The machine parts protecting system of claim 1, wherein each of said workpiece holding members are mounted equidistantly.

3. The machine parts protecting system of claim 1, wherein said moving means comprises a turret member mounted for rotation about its axis.

4. The machine parts protecting system of claim 3, wherein said workpiece holding members are each mounted equidistantly from one another proximate the peripheral portion of said turret member.

5. The machine parts protecting system of claim 4, wherein said operating stations are positioned proximate the peripheral portion of said turret member.

* * * * *